OR 2,861,176 [redacted]
446,536 51
Nov. 18, 1958 W. D. HORN ET AL 2,861,176
AUDIENCE SURVEY SYSTEM
Filed July 29, 1954
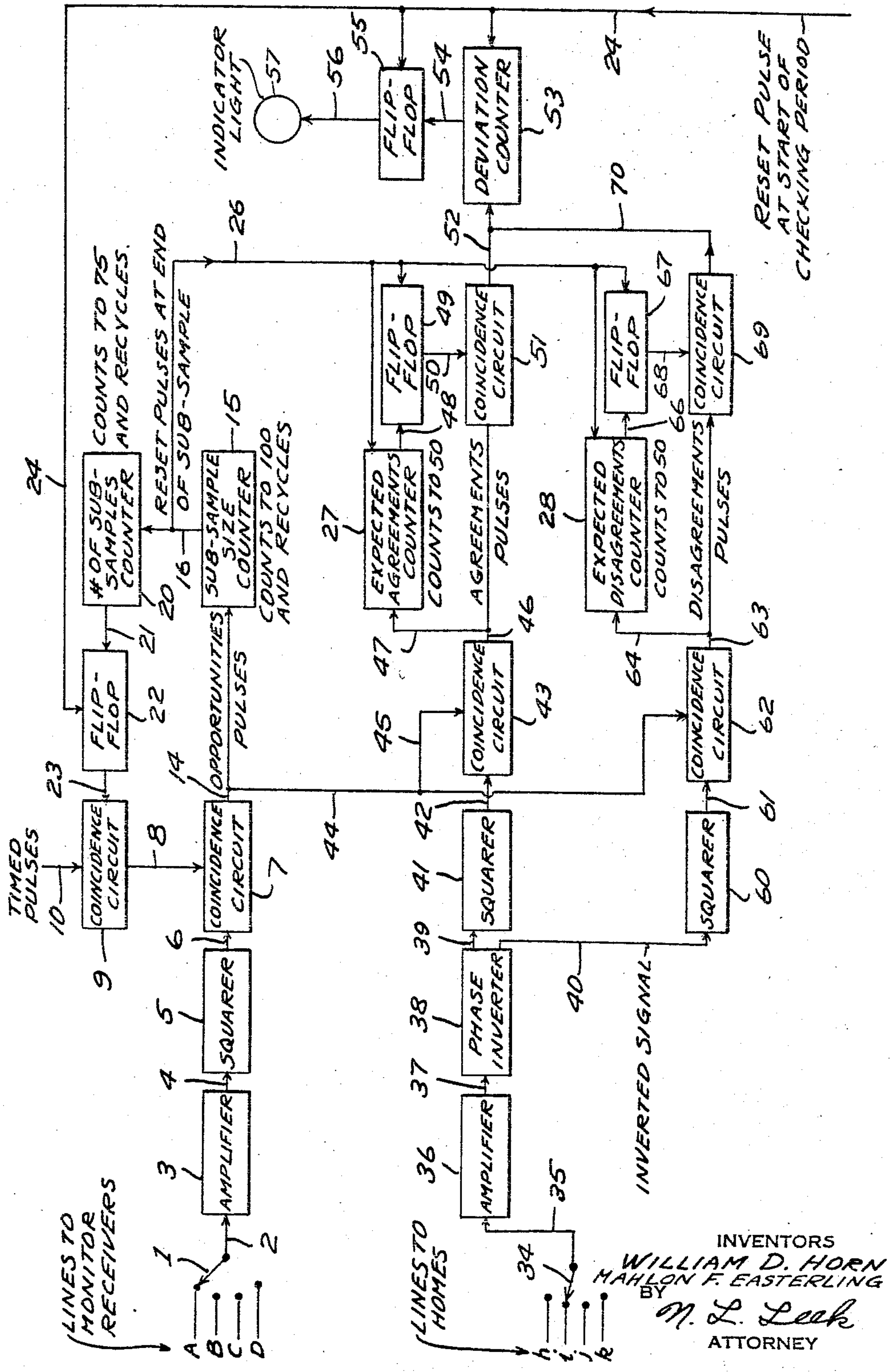
INVENTORS
WILLIAM D. HORN
MAHLON F. EASTERLING
BY
N. L. Leek
ATTORNEY United States Patent Office 2,861,176

Patented Nov. 18, 1958

2,861,176

AUDIENCE SURVEY SYSTEM

William D. Horn, New York, N. Y., and Mahlon F. Easterling, Teaneck, N. J.; said Easterling assignor to said Horn Application July 29, 1954, Serial No. 446,536

3 Claims. (Cl. 250—2)

This invention relates to radio and television survey systems for determining the program reception in a selected group of homes.

An object of the invention is to provide a new and improved system for automatically collecting the data concerning such reception.

Another object is to provide a novel and improved system of the above type.

Other and more specific objects will be apparent as the nature of the invention is more fully disclosed.

In accordance with the present invention the audio signals from the program receivers in the selected homes are transmitted to a survey center by telephone lines, transmission lines, radio links, or the like, where they are compared with audio signals derived from a plurality of monitor receivers at the survey center which are received selected programs from unknown stations.

At the survey center the instantaneous polarities of the audio signal from the home receiver are compared with the instantaneous polarities of the audio signals from the monitor receivers to determine their agreement or lack of agreement. The number of agreements over a sample period is compared with the number which would normally be expected if the home receiver and monitor receiver were receiving different programs. For example, if different programs were being received agreement would be expected to average about 50% provided a sufficiently large number of comparisons are made. If, however, the home receiver and the monitor receiver are receiving the same program and the audio signals have a substantial component which is in phase, the number of agreements will be much higher than 50%. On the other hand, if the two received signals are identical but have major components which are in an opposed phase relationship, the number of agreements will be much lower than 50%. Hence a substantial deviation from 50% in either direction indicates that the home receiver and the monitor receiver are receiving the same program.

The present invention accordingly provides for measuring the agreements over predetermined periods of time and totalizing the deviations from the normal 50% without regard to algebraic sign. When this deviation exceeds a predetermined value an indicator is actuated to designate that the home receiver is receiving the same program as the monitor receiver.

Since the deviation from the expected 50% of agreements either in a positive or a negative direction is used to indicate identity of programs, the invention provides for adding the absolute values of such deviations thus disregarding whether the deviation from 50% is positive or negative.

In a specific embodiment of the invention the sampling period during which the agreements are detected and totalized may be divided into a plurality of sub-sampling periods each of which includes a preselected number of comparisons. For example, each sub-sampling period may include one hundred polarity comparisons in which event the expected number of agreements would be 50 for each sub-sampling period if different programs were being compared. The system provides for totaling the deviations from 50 agreements over a series of sub-samples. When the two signals are the same this total deviation is large. When the two signals are different the total deviation is comparatively small. If the total is above an arbitrary amount at the end of, for example, 75 sub-samples then it may be assumed that the remote receiver is receiving the same signal as the monitor with which it is being compared. On the other hand, if the total deviations are below such arbitrary values over 75 sub-samples, it can be assumed that the remote receiver is tuned to a different station. The comparisons may be taken at high frequency so that the total sampling period may be of the order of three or four seconds.

The nature of the invention will be better understood by referring to the following description, taken in connection with the accompanying drawing in which a specific embodiment thereof has been set forth for purposes of illustration.

In the drawing the figure is a diagrammatic representation of a system embodying the present invention.

Referring to the drawing more in detail a plurality of monitor signals which are derived from the audio frequency outputs of monitor receivers receiving programs from certain selected broadcast stations are fed by lines A, B, C, etc. to the contacts of a selector switch 1 by which they are selectively connected by a lead 2 to an amplifier 3 of standard construction.

The suitably amplified signal is fed from the amplifier 3 by a lead 4 to a squaring circuit 5 of standard construction in which the signal is converted to the form of a square wave of substantially uniform amplitude but varying in width in accordance with the audio frequency components of the received signals. This square wave is applied by lead 6 to one input circuit of a coincidence circuit 7 which is of standard construction and is adapted to produce an output pulse when positive input pulses are received simultaneously in two input circuits. The coincidence circuit produces an output only when both inputs receive signals simultaneously. A coincidence circuit which may be used is described in an article entitled "Diode coincidence and mixing circuits in digital computors" by T. C. Chen in "Proceedings of the IRE," May 1950.

The other input circuit of the coincidence circuit 7 is connected by a lead 8 to the output of a second coincidence circuit 9 which may be of similar type and one input circuit of which is supplied by lead 10 from a standard pulse generator, producing, for example, 2000 pulses per second.

When the coincidence circuit 9 is in condition to pass the pulses from its input lead 10 to its output lead 8, one input of the coincidence circuit 7 receives a uniform train of positive pulses from the pulse source and the other input receives pulses derived from the audio frequency output of the monitor receiver.

The output circuit from the coincidence circuit 7 is connected by lead 14 to a sub-sample size counter 15 which may be of any standard type such as an electronic counter which is adapted to count the pulses applied thereto and may be designed to count to one hundred pulses and then automatically re-cycle with the production of a pulse in an output lead 16 at the time of re-cycling. One type of counter which may be used is described in an article entitled "Electronic Digital Counters," by Warren H. Bliss, appearing in "Electrical Engineering," April 1949.

This output pulse in the lead 16 which occurs after each total of one hundred input pulses is applied to a sub-sample counter 20 which may constitute an electronic counter of any suitable type as set forth above and is adapted to count to say seventy-five and then recycle, producing an output pulse in a lead 21 which is connected to a flip-flop circuit 22. The flip-flop circuit 22 is of the type which normally produces a positive output voltage in a lead 23 which is connected to the second input circuit of the coincidence circuit 9 to cause the coincidence circuit 9 to pass the timed pulses from the input circuit 10, so that the pulses appear in the output circuit 8 of the coincidence circuit 9 as long as the positive voltage appears on the lead 23 from the flip-flop circuit 22. However, when the flip-flop circuit 22 receives a pulse from the lead 21 the sign of the output voltage on the lead 23 is reversed so that the coincidence circuit 9 becomes blocked and the train of pulses in the output lead 8 thereof is interrupted.

For again rendering the coincidence circuit 9 operative a reset pulse is applied to the flip-flop circuit 22 from an input lead 24 which may be controlled by manual means such as a manual reset button not shown and operates to restore the polarity of the voltage in the output lead 23 to its original value so as to again render the coincidence circuit 9 conducting. A typical flip-flop circuit for this purpose is described in an article entitled "Electronic Flip-Flop as a Machine Element," by John B. Flynn, appearing in "Project Engineering," February 1952. The resetting of flip-flop 22 would take place at the start of each series of sub-samples.

The pulse in the output lead 16 is also applied by lead 26 to counters 27 and 28 which may be of standard type of electronic counter as above set forth adapted to count to fifty. Counters 27 and 28 are automatically reset at the end of each sub-sample period by the pulse supplied by the lead 26.

The audio signals from various home receivers which are transmitted to the central survey station by telephone lines, transmission lines, radio links, or the like, are received on leads *h, i, j, k,* etc. which connect to a selector switch 34, thence by a lead 35 to an amplifier 36. The amplified signal from amplifier 36 is applied by lead 37 to a phase inverter 38. The phase inverter has two outputs 39 and 40. The polarity of the signal on output lead 39 is identical with the polarity of the signal on input 37. The polarity on output lead 40 is opposite to the polarity of the signal on input 37. The phase inverter thus has one output with the same polarity as the input and a second output of opposite polarity. One type of phase inverter which may be used is described in a book by F. L. Smith, entitled "Radiatron Designer's Handbook."

The signal of unchanged polarity is applied by lead 39 to a squaring circuit 41 which may be similar to the squaring circuit 5 above mentioned:

From the squaring circuit 41 the square wave is applied by a lead 42 to one input terminal of a coincidence circuit 43. The other input terminal is supplied by leads 44 and 45 with the pulse from the output circuit 14 of the coincidence circuit 7. The output circuit of the coincidence circuit 43 is connected by the leads 46 and 47 to the expected agreements counter 27 which may be an electronic counter of any suitable type as set forth above and is adapted to count to one-half the number counted by the sub-sample size counter.

When the sub-sample size is 100, the expected agreements counter 27 would be set to count to 50. Upon reaching the count of 50, the counter 27 would produce a pulse in output lead 48 which is connected to a flip-flop circuit 49. The flip-flop 49 is of the type which normally produces a negative output voltage in a lead 50 connected to one input of the coincidence circuit 51 and serves to block the coincidence circuit 51. Upon reaching a count of 50 the counter produces a pulse in lead 48 which causes the flip-flop 49 to reverse polarity in the output lead 50 unlocking the coincidence circuit which then passes pulses appearing on lead 46.

The output circuit of the coincidence circuit 51 is connected by a lead 52 to a deviation counter 53 which is adapted to count all the pulses applied to it, and is an electronic counter of design similar to those mentioned earlier. This counter will count all agreements pulses which come after the first fifty in any sub-sampling period.

The deviation counter 53 is adapted to produce a pulse in output lead 54 at the end of a predetermined count. The lead 54 is connected to a flip-flop 55 which normally produces a negative output on its lead 56. When a pulse appears on lead 54 this negative output becomes positive and lights a neon indicator light 57.

The inverted signal from phase inverter 38 is applied by lead 40 to a squaring circuit 60 similar to those previously described. From the squaring circuit 60 the square wave is applied by a lead 61 to one input terminal of a coincidence circuit 62, the other input terminal of which is supplied by lead 44 with the pulse from the output circuit 14 of the coincidence circuit 7. When the polarity of the signal on leads 61 and 44 are identical, coincidence circuit 62 produces a pulse on lead 63.

The pulse in lead 63 is applied by lead 64 to the expected disagreements counter 28 which is adapted to count to one-half of the sub-sample size number. Counter 28 would be set to count to 50 if the sub-sample size was 100. Upon reaching the count of 50, the counter 28 would produce a pulse in output lead 66 which is connected to a flip-flop circuit 67. The flip-flop 67 is of the type which normally produces a negative output voltage which serves to block the coincidence circuit 69. Upon reaching a count of 50, the counter 28 produces a pulse in lead 66 which causes the flip-flop 67 to reverse polarity in its output lead 68, thereby unlocking coincidence circuit 69 which then will pass pulses appearing on lead 63. The output circuit of coincidence circuit 69 is connected by leads 70 and 52 to deviation counter 53. This counter counts all pulses which reach it, including those passed by coincidence circuit 51 as well as those by coincidence circuit 69.

At the end of each sub-sampling period the pulse produced by the sub-sample size counter 15 through leads 16 and 26 resets counters 27 and 28 to zero, and resets flip-flops 49 and 67 to their normal condition in preparation for the start of a new sub-sample.

When the predetermined number of sub-samples has been taken it is necessary to prepare for a new series of sub-samples by producing a reset pulse on lead 24 which is connected to reset flip-flops 22 and 55 and deviation counter 53. The means of producing the reset pulse is not shown in the schematic diagram, but may be any appropriate means such as a manual push-button.

The operation of the system will be best understood from a specific example. Assume the timed pulses in the lead 10 are derived from a source having a frequency of 2000 positive pulses per second so that this number per second are applied to coincidence circuit 9. Assume that each sub-sample consists of 100 comparisons, during each of which occurs an agreement in polarity between the monitor signals and the timed pulses.

The number of comparisons are determined by the number of pulses appearing on lead 14. These may be called opportunities pulses. They are counted by the sub-sample size counter 15 which counts to 100 and recycles and at the same time produces a pulse on output lead 16 which is connected to the sub-samples counter 20. Counter 20 counts these pulses until it reaches a total count of 75 sub-samples. Then it automatically recycles, and at the same time produces a pulse on lead 21 which through flip-flop 22 and the coincidence circuit 9 ends the checking period.

A checking period is here assumed to be 75 sub-samples. It is the period during which the home signal is checked against a station signal to see if they are the same or different.

The monitor signal which is received over lead 2 is amplified and squared in amplifier 3 and squaring circuit 5 and is applied to one input circuit of the coincidence circuit 7. When the signal received from the monitor receiver produces a positive pulse in the lead 6 at the same time that a positive pulse is received from the lead 8, a pulse is produced in the output lead 14. This pulse is applied by leads 44 and 45 to the coincidence circuit 43. To the other input of coincidence circuit 43 is connected the amplified and squared home signal. If the polarity of the two inputs are the same, then a pulse appears on output lead 46. A pulse here means that the home and monitor signals are present and momentarily agree in polarity.

The output pulse on lead 14 is also connected by lead 44 to one input of coincidence circuit 62. On the other input of coincidence circuit 62 is connected the amplified, inverted, and squared home signal. This is exactly like the signal on lead 42 except that it is opposite in sign. If the polarity of the two inputs of coincidence circuit 62 agree, then a pulse appears on output lead 63. A pulse here indicates that the home and monitor signals are present and disagree in polarity.

The pulses appearing on the lead 46 always occur at different times from the pulses on lead 63 because the home signal can either agree or disagree with the monitor signal polarity but it cannot do both things at the same time.

As has been noted, a pulse in the lead 46 indicates agreement between the instantaneous polarities of the monitored signal and the home signal during the timed pulse appearing on lead 10. Hence the number of pulses in lead 46 indicate the number of agreements. These pulses are applied to the expected agreements counter 27 which is adapted to count to 50 and then produce an output pulse. The output pulse is applied to the flip-flop circuit 49 to reverse the polarity in lead 50, allowing the coincidence circuit 51 to pass all further agreements pulses until the end of the sample. These pulses pass through lead 52 and are counted on the deviation counter 55.

On the other hand, a pulse in lead 63 indicates disagreement between the instantaneous polarities in the monitor signal and the home signal. Therefore the number of pulses in lead 63 indicate the number of disagreements. These pulses are counted by the expected disagreements counter 28, which produces an output pulse in the lead 66 when a count of 50 is reached. The output pulse is applied to flip-flop 67 to reverse the polarity in lead 68, allowing coincidence circuit 69 to pass all further disagreements pulses until the end of the sub-sample. These pulses pass through leads 70 and 52 and are counted on the deviation counter 53.

The operation of the system here described is based on the measurement of the deviation from 50 of the number of agreements with a sub-sample. If the number of agreements is more than 50, then deviation is measured by the number of pulses passed by coincidence circuit 51 during the sub-sample. If the number of agreements is below 50, then deviation is measured by the number of pulses passed by coincidence circuit 69 during the sub-sample. The number of pulses passed by coincidence circuit 69 is the number of disagreements above 50. This is identical with 50 minus the number of agreements. Thus, deviation is measured whether it is above 50 counts or below.

When home and monitor signals are the same, these deviations from 50 are large. When home and monitor signals are different, these deviations are small. The arbitrary number preset in the deviation counter 53 is such that when the signals are alike the arbitrary number is exceeded, and when the signals are different, the number is not reached. When the arbitrary number, say 750, is reached, a pulse is produced in the output lead 54 of the deviation counter 53, which through flip-flop 55 operates an indicator light 57 to indicate that identity has been established between the monitored signal and the home signal.

Now, assume that there are 70 agreements in each sub-sample during a checking period. This would indicate identical signals with a substantial in-phase component between them. Here, counter 53 would count 1500 pulses from coincidence circuit 51. There would be no pulses from coincidence circuit 69 because the number of disagreements would be below 50 in each sub-sample. Since 1500 is above the arbitrary number of 750, a pulse will be produced in the lead 54, causing the indicator light 57 to show agreement between the two signals.

Assume, on the other hand, that the home and monitor signals are identical, but have an out-of-phase component which causes there to be 35 agreements in each sub-sample. In this case, there would be 65 disagreements in each sub-sample and the deviation counter would count 1125 deviation pulses from lead 70. In each of the 75 sub-samples 15 pulses would be passed by coincidence circuit 69. No pulses would be passed by coincidence circuit 51 since the number of agreements would never exceed 50 in any sub-sample. Since 1125 is above the arbitrary number of 750, a pulse will be produced at lead 54 causing the indicator light 57 to show agreement between the two signals.

Obviously the above mentioned values are taken for purposes of illustration only and may be varied in accordance with the particular requirements. Also, if the signals of the home receiver and the monitored receiver are substantially in phase the counter 28 would not be required as the agreements would necessarily be at least 50 whenever the two signals were identical. On the other hand, if the signals were in opposed phase relationship, the counter 27 would not be required since less than 50 agreements would occur whenever the two received signals were identical. However, normally both conditions exist to a certain extent as the complex audio signal may sometimes be largely in phase and sometimes in opposed phase and the above described system utilizes both situations in arriving at a total count which indicates whether or not the received signals are identical.

To simplify the system, the sample period can be counted as a unit instead of breaking the period into a plurality of sub-sampling periods. Usually, however, a more dependable indication can be obtained by the sub-sampling method above described.

In the above system, each home signal *h, i, j, k,* is checked in succession for tuning to one station, say, the station originating monitor signal A. The number of times the indicator light flashes indicates the number of homes tuned to this station. This whole process is repeated for each of the stations.

If automatic counting and recording is desired, this can be provided, but is not represented in the block diagram.

If a more rapid cycling is required the above equipment can be duplicated for each monitor so that each home is compared with all of the monitor signals at the same time.

The homes may be connected by remote controlled selector switches which connect the audio circuits of the homes successively to the same line, or they can be connected to the survey center by individual lines as indicated. In case of a time delay due to transmission from a distance a similar delay may be introduced into the monitor signals.

The count obtained during the checking period may be squared, using standard digital computer techniques, and the sum of the sequences utilized to actuate the signal 57. This will reduce the time required for the sampling.

Other means can be used for effecting the counts for example the incoming information can be recorded and the recordings analyzed in an appropriately programmed electronic computer.

Other adaptations and uses will be apparent to a person skilled in the art.

What is claimed is:

1. Apparatus for determining whether a selected home receiver is receiving the program being broadcast from a designated broadcast station, which comprises a monitor receiver at a survey center adapted to monitor said broadcast station and to derive therefrom an audio signal, means for transmitting to said survey center an audio signal indicative of the audio signal being received by said selected home receiver, means for repeatedly comparing the instantaneous polarities of said audio signals at selected spaced intervals over a predetermined series of sub-sample periods to determine whether or not the polarities agree during each such interval, means including counters responsive to said comparing means for determining the total deviation both plus and minus of the number of polarity agreements during the series of sub-sample periods from 50% of the number of comparisons, and means responsive to said last means producing an indication whenever such total exceeds a predetermined value.

2. Apparatus for determining whether a selected home receiver is receiving the program being broadcast from a designated broadcast station, which comprises a monitor receiver at a survey center adapted to monitor said broadcast station and to derive therefrom an audio signal, means for transmitting to said survey center an audio signal indicative of the audio signal being received by said selected home receiver, means for repeatedly comparing the instantaneous polarities of said audio signals at selected spaced intervals over a series of sub-sample periods of a given number of comparisons each to determine whether or not the polarities agree during each such interval, means including counters responsive to said comparing means for counting the number of polarity agreements above half of the number of comparisons in each sub-sample, separate means including counters responsive to said comparing means for counting the number of disagreements above half of the number of comparisons in each sub-sample, and means responsive to said counters for totaling both counts over the entire series of sub-samples as an indication of the identity or lack of identity of the two audio signals being compared.

3. Apparatus for determining whether a selected home receiver is receiving the program being broadcast from a designated broadcast station, which comprises a monitor receiver at a survey center adapted to monitor said broadcast station and to derive therefrom an audio signal, means for transmitting to said survey center an audio signal indicative of the audio signal being received by said selected home receiver, comparing means responsive to the instantaneous polarities of said signals and adapted to determine the agreements and disagreements in instantaneous polarities, and toalizer means actuated by said comparing means and connected to determine the proportion of actual agreements to the maximum possible agreements and the proportion of actual disagreements to the maximum possible agreements.

References Cited in the file of this patent

UNITED STATES PATENTS 2,630,366 Rahmel ---------------- Mar. 3, 1953

2,678,382 Horn et al. ------------ May 11, 1954